US011520397B2

(12) United States Patent
Tsai

(10) Patent No.: US 11,520,397 B2
(45) Date of Patent: Dec. 6, 2022

(54) POWER MANAGEMENT OF ARTIFICIAL INTELLIGENCE (AI) MODELS

(71) Applicant: Microsoft Technology Licensing, LLC, Redmond, WA (US)

(72) Inventor: Chia-Hung Tsai, Taipei (TW)

(73) Assignee: Microsoft Technology Licensing, LLC, Redmond, WA (US)

( * ) Notice: Subject to any disclaimer, the term of this patent is extended or adjusted under 35 U.S.C. 154(b) by 120 days.

(21) Appl. No.: 17/079,026

(22) Filed: Oct. 23, 2020

(65) Prior Publication Data
US 2022/0129057 A1  Apr. 28, 2022

(51) Int. Cl.
*G06F 1/32* (2019.01)
*G06F 1/3212* (2019.01)

(52) U.S. Cl.
CPC ................ *G06F 1/3212* (2013.01)

(58) Field of Classification Search
CPC .............. G06F 1/3212; G06N 20/00
See application file for complete search history.

(56) References Cited

U.S. PATENT DOCUMENTS

| 9,696,782 B2 | 7/2017 | Chandra et al. |
| 10,257,665 B2 | 4/2019 | Goel et al. |
| 10,324,773 B2 | 6/2019 | Wing et al. |
| 10,448,327 B2 | 10/2019 | Fuleshwar Prasad et al. |
| 2019/0050049 A1* | 2/2019 | Qawami ............... G06F 1/3212 |
| 2019/0129408 A1 | 5/2019 | Cella et al. |
| 2019/0146482 A1 | 5/2019 | Cella et al. |
| 2019/0215773 A1* | 7/2019 | Ljung ............... H04W 52/0261 |
| 2019/0257886 A1 | 8/2019 | Hooshmand et al. |
| 2019/0349426 A1 | 11/2019 | Smith et al. |
| 2020/0311561 A1 | 10/2020 | Naaman et al. |
| 2021/0287078 A1* | 9/2021 | Liu ..................... G06N 3/0675 |

FOREIGN PATENT DOCUMENTS

WO   WO-2022047204 A1 *  3/2022

OTHER PUBLICATIONS

"International Search Report and Written Opinion Issued in PCT Application No. PCT/US21/043356", dated Oct. 28, 2021, 11 Pages.

(Continued)

*Primary Examiner* — Stefan Stoynov
(74) *Attorney, Agent, or Firm* — Holzer Patel Drennan

(57) ABSTRACT

Methods, systems, apparatuses, and computer-readable storage mediums are described for altering a power consumption of a battery-powered device. In an example system, a power monitor is configured to measure, for each of a plurality of components in the battery-powered device, a power consumption of the component during execution of an AI model that is stored on the device. A consumption analyzer is configured to predict whether a battery criterion would be satisfied during operation of the battery-powered device based on the measured power consumption of the components. In examples, operation of the device may include operation of the device in which the AI model is executed. A model retraining engine retrains the AI model if the battery criterion is not predicted to be satisfied during operation of the device, and a retrained AI model may be provided for execution on the battery-powered device.

20 Claims, 6 Drawing Sheets

(56) References Cited

OTHER PUBLICATIONS

Shin, et al., "Online Estimation of the Remaining Energy Capacity in Mobile Systems Considering System-Wide Power Consumption and Battery Characteristics", In Proceedings of 18th Asia and South Pacific Design Automation Conference, Jan. 22, 2013, pp. 59-64.
"IoT Power Consumption Control and Monitoring", Retrieved from: https://web.archive.org/web/20200504232558/https:/www.digiteum.com/portfolio/electricity-consumption-monitoring-remote-control, May 4, 2020, 10 Pages.
Konstantakos, et al., "Energy Consumption Estimation in Embedded Systems", In Journal of IEEE Transactions on instrumentation and measurement, vol. 57, Issue 4, Apr. 2008, pp. 797-804.
Lekidis, et al., "Model-Based Design of Energy-Efficient Applications for IoT Systems", In Proceedings of the 1st International Workshop on Methods and Tools for Rigorous System Design, Apr. 15, 2018, pp. 24-38.
Motlagh, et al., "Internet of Things (IoT) and the Energy Sector", In Energies, vol. 13, Issue 2, Jan. 19, 2020, 27 Pages.
Yazici, et al., "Edge Machine Learning: Enabling Smart Internet of Things Applications", In Big data and cognitive computing, vol. 2, Issue 3, Sep. 3, 2018, 17 Pages.

\* cited by examiner

400

| Determine whether a predicted battery life of the battery-powered device exceeds a minimum operation length | 402 |

| Add, to a feature vector used to retrain the first AI model, a power factor associated with at least one of the plurality of components. | 502 |

| Determine whether a retrained AI model satisfies an accuracy criterion prior to providing the retrained AI model | 602 |

FIG. 6

POWER MANAGEMENT OF ARTIFICIAL INTELLIGENCE (AI) MODELS

BACKGROUND

Artificial intelligence (AI) techniques are used in a wide variety of applications. The use of AI in smaller and/or portable devices, such as battery-powered devices, has been increasingly popular. For instance, battery-powered devices may implement an AI model that can be trained to detect or classify objects in images, or perform other automated tasks in various environments, such as manufacturing facilities, retail establishments, computing and/or networking environments, etc.

In some implementations, it may be desired that a battery-powered device be capable of operating for a certain length of time on a single charge. However, when such a device implements an AI model that is not optimized for the particular device, the battery consumption may be excessive during operation, resulting in a battery life that does not meet the user's expectations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described for altering a power consumption of a battery-powered device. In an example system, a power monitor is configured to measure, for each of a plurality of components in the battery-powered device, a power consumption of the component during execution of an AI model that is stored on the device. A consumption analyzer is configured to predict whether a battery criterion would be satisfied during operation of the battery-powered device based on the measured power consumption of the components. In examples, operation of the device may include operation of the device in which the AI model is executed. A model retraining engine retrains the AI model if the battery criterion is not predicted to be satisfied during operation of the device, and a retrained AI model may be provided for execution on the battery-powered device. In this manner, the power consumption of the battery-powered device may be altered, such as to reduce the overall power consumption to increase the battery life of the device.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 4 shows a flowchart of a method for determining whether a predicted battery life of a device exceeds a minimum operation length, in accordance with an example embodiment FIG. 5 shows a flowchart of a method for adding a feature vector to retrain an AI model on a device, in accordance with an example embodiment.

FIG. 6 shows a flowchart of a method for determining whether a retrained AI model satisfies an accuracy criterion, in accordance with an example embodiment.

Figure 1:
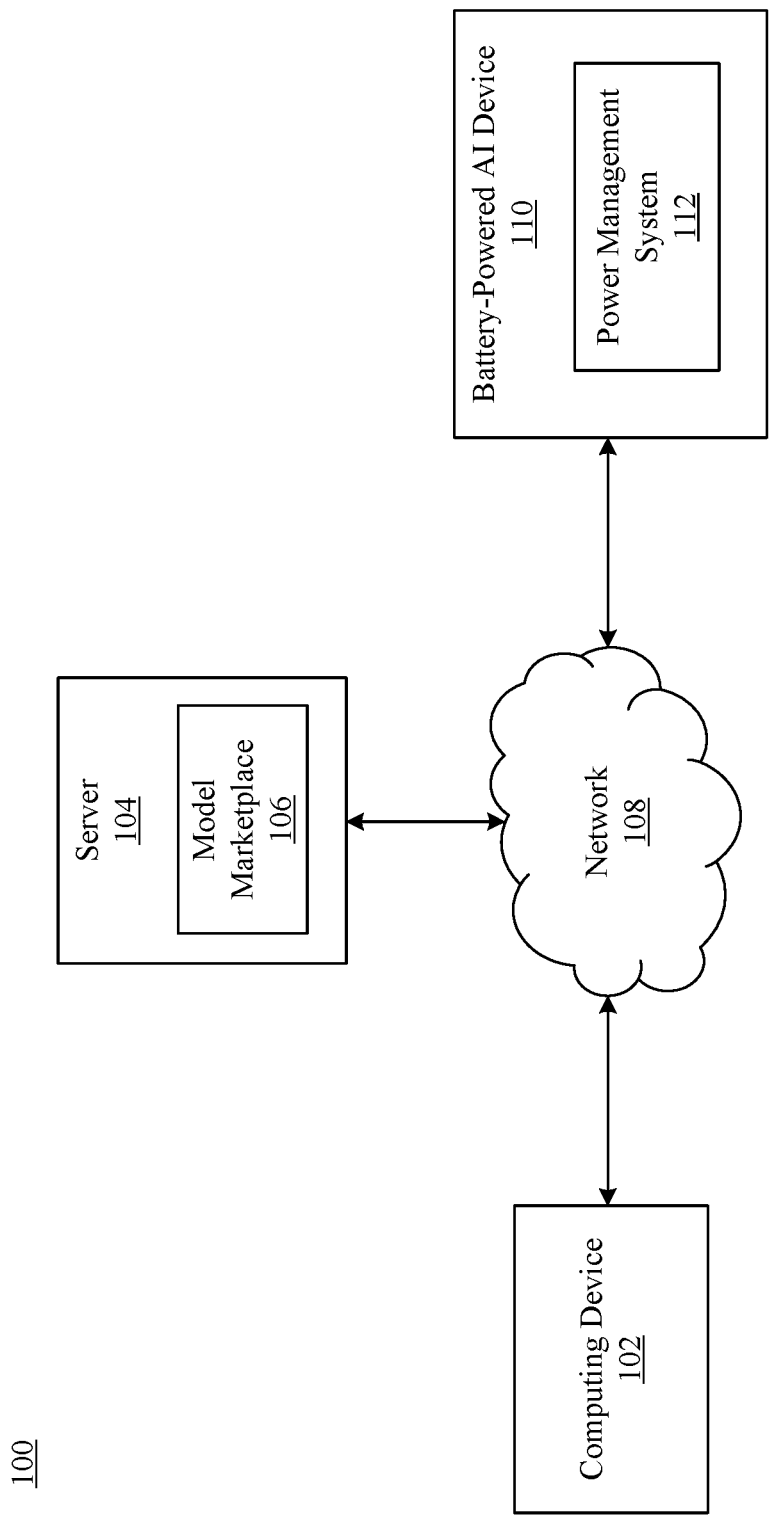
FIG. 1 shows a block diagram of a system for managing a power consumption of a device, in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

AI techniques are used in a wide variety of applications. The use of AI in smaller and/or portable devices, such as battery-powered devices, has been increasingly popular. For instance, battery-powered devices may implement an AI model that can be trained to detect or classify objects in images, or perform other automated tasks in various environments, such as manufacturing facilities, retail establishments, computing and/or networking environments, etc.

In some implementations, it may be desired that a battery-powered device be capable of operating for a certain length of time on a single charge. However, when such a device implements an AI model that is not optimized for the particular device, the battery consumption may be excessive during operation, resulting in a battery life that does not meet the user's expectations.

Embodiments described herein are directed to altering a power consumption of a battery-powered device. In an example system, a power monitor is configured to measure, for each of a plurality of components in the battery-powered device, a power consumption of the component during execution of an AI model that is stored on the device. A consumption analyzer is configured to predict whether a battery criterion would be satisfied during operation of the battery-powered device based on the measured power consumption of the components. In examples, the operation of the device on which the prediction is based may include operation of the device in which the AI model is executed. A model retraining engine retrains the AI model if the battery criterion is not predicted to be satisfied during the operation of the device, and a retrained AI model may be provided for execution on the battery-powered device. In this manner, the power consumption of the battery-powered device may be altered, such as to reduce the overall power consumption to increase the battery life of the device.

The embodiments described herein may advantageously improve the performance of devices by reducing their power consumption, which may result in longer runtimes on a single charge. In particular, techniques described herein may cause an AI model implemented on a battery-powered device to be retrained in manner that reduces the device's overall power consumption while also maintaining a minimum accuracy threshold, thereby resulting in a longer lasting device that still performs accurately. For instance, as will be described in greater detail below, the AI model may be retrained to reduce processing cycles during execution of the model, reducing memory and/or storage accesses, reducing networking utilization, and/or reducing processing resources of other device components. By leveraging such reduction when retraining an AI model on the device, not only may the device benefit from an overall reduction in resource usage (e.g., processing, storage, and/or network usage), the device's total power consumption may also be reduced as a result, leading to overall improved performance of the device. Further, as mentioned above, such performance improvements may be achieved without significant sacrifices in accuracy.

Improvements in the power consumption of battery-powered devices implementing AI models while also maintaining the accuracy of those AI models advantageously improves the functioning of the devices, as those devices may last longer on a single charge. For instance, technological fields in which such devices implementing AI models are utilized are improved. For example, consider a scenario in which a predictive AI model is used in an industrial process, such as predictive maintenance or manufacturing. The ability to predict disruptions to the production line in advance of that disruption taking place, or to analyze objects coming off a production line, may be invaluable to the manufacturer. The manager is enabled to schedule the downtime at the most advantageous time and eliminate unscheduled downtime, as well as perform any appropriate adjustments to the manufacturing process more readily. Unscheduled downtime and faulty products can hit the profit margin hard and also can result in the loss of the customer base. It also disrupts the supply chain, causing the carrying of excess stock. A battery-powered AI device that excessively consumes power would inadvertently cause undesired downtimes that disrupt the supply chain.

Consider yet another scenario in which a battery-powered device implementing an AI model is used in a restaurant or other product-producing facility, where the AI model is used to track how many items are being made and/or sold. A camera mounted in the restaurant can capture images of a counter or the like where completed products are placed and log the number and/or frequency at which products are being made and/or sold. The AI model can allow a business to increase profits by advertising items that may not be selling as well, improving personnel efficiency during high demand times, updating product offerings, etc. By reducing the power consumption of devices in these settings, product sales and/or tracking may be carried out with reduced disruptions.

Consider yet another scenario in which an AI model is used in a retail establishment, such as in a self-checkout area of a retail business. A camera mounted near the self-checkout register may apply an AI model to detect items being scanned at the register, and be used to compare with the weights of those items to reduce the likelihood of theft or improper barcode labeling. By providing devices with AI models with improved power consumption while maintaining the accuracy of the AI models, items can be accurately identified in self-checkout registers with reduced disruptions, potentially resulting in improved profit margins.

Consider a further scenario in which a battery-powered device implementing an AI model is used in biotechnology for predicting a patient's vitals or whether a patient has a disease. A battery-powered device that consumes too much power to execute the AI model may result in missed classifications of a patient's vitals and/or disease, potentially resulting in the patient not receiving necessary treatment.

These examples are just a small sampling of many technologies that would be improved by reducing the power consumption of battery-powered devices implementing AI models. Additional, non-limiting, examples are also described elsewhere in this disclosure.

As follows, example embodiments are described herein directed to techniques for altering a power consumption of a battery-powered device. For instance, FIG. 1 shows a block diagram of a system for managing a power consumption of a device, in accordance with an example embodiment. As shown in FIG. 1, system 100 includes a computing device 102, a server 104, a model marketplace 106, and a battery-powered artificial intelligence (AI) device 110. Server 104 includes a model marketplace 106. Battery-powered AI device 110 includes a power management system 112. As will be described in greater detail below, power management system 112 may obtain an AI model from model marketplace 106 for execution. Power management system 112 is configured to determine whether execution of the obtained AI model would result in an excessive power consumption of a battery of battery-powered AI device 110. If an excessive power consumption is observed, power management system 112 may retrain the obtained AI model to reduce the power consumption. Example computing devices that may incorporate the functionality of computing device 102, server 104, and/or battery-powered AI device 110 (or any subcomponents therein) are described below in reference to FIGS. 7 and 8. It is noted that system 100 may comprise any number of devices, including those illustrated in FIG. 1 and optionally one or more further devices or components not expressly illustrated. System 100 is further described as follows.

Network 108 may include one or more of any of a local area network (LAN), a wide area network (WAN), a personal area network (PAN), a combination of communication networks, such as the Internet, and/or a virtual network. In example implementations, computing device 102, server 104, and/or battery-powered AI device 110 may be communicatively coupled to each other via network 108. In an implementation, any one or more of computing device 102, server 104, and/or battery-powered AI device 110 may communicate via one or more application programming interfaces (API) and/or according to other interfaces and/or techniques. Computing device 102, server 104, and/or battery-powered AI device 110 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Computing device 102 includes any one or more computing devices of one or more users (e.g., individual users, family users, enterprise users, governmental users, etc.) that may comprise one or more applications, operating systems, virtual machines, storage devices, etc. that may be used to communicate with battery-powered AI device 110 to obtain AI inferences therefrom. For instance, computing device 102 may be configured to obtain, from battery-powered AI device 110, an output of an AI model executed thereon (e.g., notification or classification of a detected object). AI models executed on battery-powered device may comprise any type of prediction model, including but not limited to neural network (NN) models, deep neural network (DNN) models, machine-learning (ML), or any other type of AI model that may be configured to generate an output based on a set of input data. Computing device 102 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device 102 is not limited to a physical machine, but may include other types of machines or nodes, such as a virtual machine. Computing device 102 may interface with other components illustrated in FIG. 1 through APIs and/or by other mechanisms.

Computing device 102 may comprise any suitable user interface for interaction (e.g., via a browser by navigation to a web page, via an application stored thereon, etc.), examples of which are described below with respect to FIGS. 7 and 8. In some examples, computing device 102 may also be used to configure one or more aspects of battery-powered AI device 110, such as obtaining of an AI model from model marketplace 106 (or obtaining an AI model from any other source or device), training or retraining of the obtained AI model, or management of the power consumption of battery-powered AI device 110 based on execution of the AI model. As examples, computing device 102 may provide an interface through which operating modes or features may be configured, enabled, or disabled. In another example, computing device 102 may provide an interface through which training data may be provided to battery-powered AI device 110.

Server 104 may comprise any number of devices, such as a network-accessible server (e.g., a cloud computing server network) that may store and/or provide various AI models for deployment to one or more computing devices, such as battery-powered AI device 110. For example, server 104 may comprise a group or collection of servers (e.g., computing devices) that are each accessible by a network such as the Internet (e.g., in a "cloud-based" embodiment) to obtain AI models, store AI models in a repository, and provide (e.g., upon request) an AI model to a device for execution. In example embodiments, server 104 is a computing device that is located remotely (e.g., in a different facility) from computing device 102 and/or battery-powered AI device 110, and communicatively coupled thereto via network 132. Server 104 may comprise any number of computing devices, and may include any type and number of other resources, including resources that facilitate communications with and between servers, storage by the servers, etc. (e.g., network switches, storage devices, networks, etc.). In an embodiment, devices of server 104 may be co-located (e.g., housed in one or more nearby buildings with associated components such as backup power supplies, redundant data communications, environmental controls, etc.) to form a datacenter, or may be arranged in other manners. Accordingly, in an embodiment, server 104 may be a datacenter in a distributed collection of datacenters.

As described above, server 104 may include model marketplace 106. Model marketplace 106 may comprise a user-accessible repository in which AI models may be uploaded, stored, searched, viewed, and/or downloaded. For instance, model marketplace 106 may comprise AI models such as NN models, DNN models, ML models, or any other type of AI model, that may serve a variety of environments or applications, such as object detection, object classification, human detection, face detection, autonomous driving, computing or networking applications, etc.

In examples, AI models of model marketplace 106 may comprise pre-trained models. Model marketplace 106 may also comprise a querying or searching interface that may enable a requestor to search and/or view AI models stored in the marketplace for downloading to a computing device (e.g., battery-powered AI device 110). AI models of model marketplace 106 may be uploaded anyone, including but not limited to individual users, AI model experts, device manufacturers, service providers, software providers, etc. In example implementations, AI models of model marketplace 106 may be downloaded (e.g., deployed) to different types of devices. For instance, even though a particular AI model of model marketplace 106 may be generated and/or trained using a particular hardware configuration, the AI model may be downloaded and executed on different types of devices having different hardware configurations (e.g., different processing components, wireless adapters, cameras, storage units, batteries, etc.).

Battery-powered AI device 110 may comprise any type of device that may execute an AI model. Battery-powered AI device 110 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system, a Microsoft Windows® phone, etc.), a wearable computing device (e.g., a head-mounted device including smart glasses such as Google® Glass™, Oculus Rift® by Oculus VR, LLC, etc.), or other type of mobile device. In example implements, battery-powered AI device 110 may be powered with one or more batteries, including but not limited to alkaline batteries, lithium-ion (Li-ion) batteries, lithium coin batteries, carbon zinc batteries, nickel cadmium batteries (Ni-Cad), nickel-metal hydride (Ni-MH) batteries, lead-acid batteries, or other types of batteries as will be appreciated to those skilled in the art. Batteries may be internal or external to a housing of battery-powered AI device 110, and may be disposable or rechargeable. Batteries of battery-powered AI device 110 may be any size or shape (e.g., coin, AAA, AA, C, D, automotive, etc.). In implementations, a total battery capacity of batteries of battery-powered AI device 110 may comprise an aggregate capacity of such batteries.

In implementations, battery-powered AI device 110 may comprise a portable device, such as an Internet of Things (IoT) or Artificial Intelligence of Things (AIoT) device. Such devices may include one or more components, such as a sensor, for capturing data that is provided to an AI model to generate an output (e.g., a prediction). In some implementations, battery-powered AI device 110 may comprise one or more processing components, including but not limited to a central processing unit (CPU), a microcontroller or microcontroller unit (MCU), a microprocessor or micro processing unit (MPU), system on module or system on motherboard (SoM), system on a chip (SoC), multi-chip module (MCM), or other type of processor. In some examples, one or more of such processing components may comprise a hardware accelerator such as a tensor processing unit (TPU), a graphics processing unit (GPU), a field-programmable gate array (FPGA), an Application Specific Integrated Circuit (ASIC), or other specialized hardware processor that may execute certain types of processing. For instance, a hardware accelerator of battery-powered AI device 110 may perform processing operators in connection with retraining an AI model stored on the device As noted above, battery-powered AI device 110 may obtain an AI model from model marketplace 106 (or from any other source) for execution thereon. However, since the AI model may have been trained or otherwise optimized for a different hardware configuration than battery-powered AI device 110 (e.g. different processors, batteries, etc.), execution of the AI model on battery-powered AI device 110 may result in excessive power consumption that may deplete batteries of battery-powered AI device 110 sooner than desired. Thus, even if an obtained AI model may be executed on battery-powered AI device 110 and may generate predictions in accordance with a desired accuracy, execution of the AI model may result in the device depleting the available battery capacity, rendering battery-powered AI device 110 inoperable until the battery has been replaced or recharged.

Power management system 112 may be configured to manage the power consumption of battery-powered AI device 110, such as to reduce the power consumption when executing an obtained AI model. For instance, power management system 112 may function as a power meter on battery-powered AI device 110 that may selectively retrain an AI model obtained from model marketplace 106 to ensure that the model can achieve a desired efficiency and/or accuracy, while not negatively impacting the battery life of the device. In other words, since AI models on model marketplace 106 have been pre-trained it is unknown whether deploying the model to a particular device for execution will excessively consume power on the device in a manner that would deplete the device's battery sooner than expected. Power management system 112 may measure each component's power consumption (e.g., measuring current consumption, applied voltage, etc., to calculate power), at runtime of an obtained AI model, and feedback such information to device itself for retraining the AI model. For example, when AI model 106 is deployed on battery-powered AI device 110, power management system 112 may be configured to retrain the AI model using one or more additional power factors from the device's components. Such retraining may result in a new weight of factors in the retrained model (e.g., a new weight of factors based on the particular device's hardware configuration, such as the internal components of a SOM module and other associated components). Upon generating a retrained AI model, the power consumption may be measured and evaluated in a similar manner to determine whether the power consumption is within an acceptable amount.

In examples, as will be described in greater detail below, power management system 112 may monitor different power consumption information (e.g., amount of consumption, time of consumption, etc.) of different components of battery-powered AI device 110 during execution of the obtained AI model. Based on the monitored power consumption, the obtained AI model may be retrained in a manner that would generate a retrained AI model that is predicted to consume less power (e.g., by reducing storage or memory access, reducing processing cycles, lowering a camera resolution, etc.) such that execution of the retrained AI model may result in battery-powered AI device 110 lasting at least a desired length of time before the battery is depleted. Further, as described herein, the retrained model may also be benchmarked for accuracy to ensure that the retrained model performs as intended. In this manner, power management system 112 may be configured to tailor an obtained AI model to a given device to reduce the power consumption of an AI model obtained from a model marketplace such that battery-powered AI device 110 may meet a desired battery criterion (e.g., 30 days on a single battery charge), as well as perform accurately.

It is noted and understood that implementations are not limited to the illustrative arrangement shown in FIG. 1. For instance, computing device 102, server 104, and battery-powered AI device 110 need not be separate from each other. In some examples, computing device 102, server 104, and battery-powered AI device 110 (or any subcomponents therein) may be located in or accessible via the same computing device. Furthermore, system 100 may comprise any number of computing devices, servers, and/or battery-powered devices (e.g., tens, hundreds, or even thousands of such devices) coupled in any manner.

Figure 2:
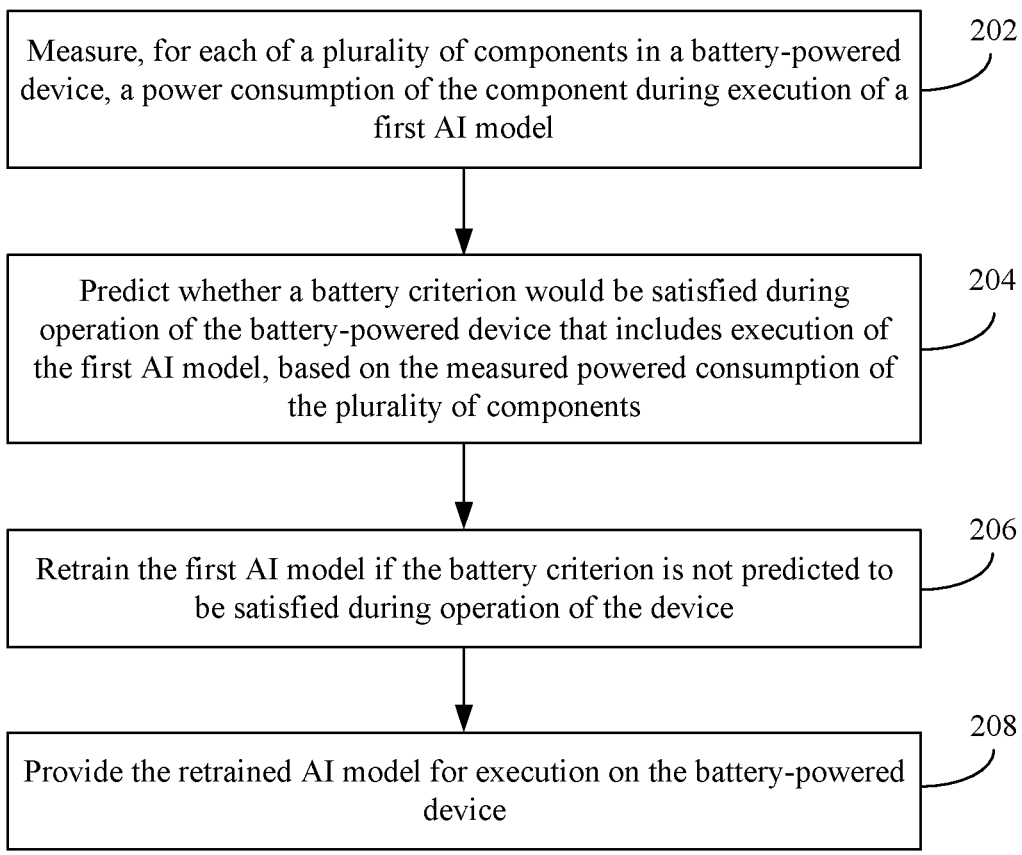
FIG. 2 shows a flowchart of a method for altering a power consumption of a device, in accordance with an example embodiment.

Power management system 112 may operate in various ways to manage the power consumption of battery-powered AI device during execution of an AI model. For instance, power management system 112 may be carried out according to FIG. 2. FIG. 2 shows a flowchart 200 of a method for altering a power consumption of a device, in accordance with an example embodiment. For illustrative purposes, flowchart 200 and power management system 112 are described as follows with respect to FIG. 3.

Figure 3:
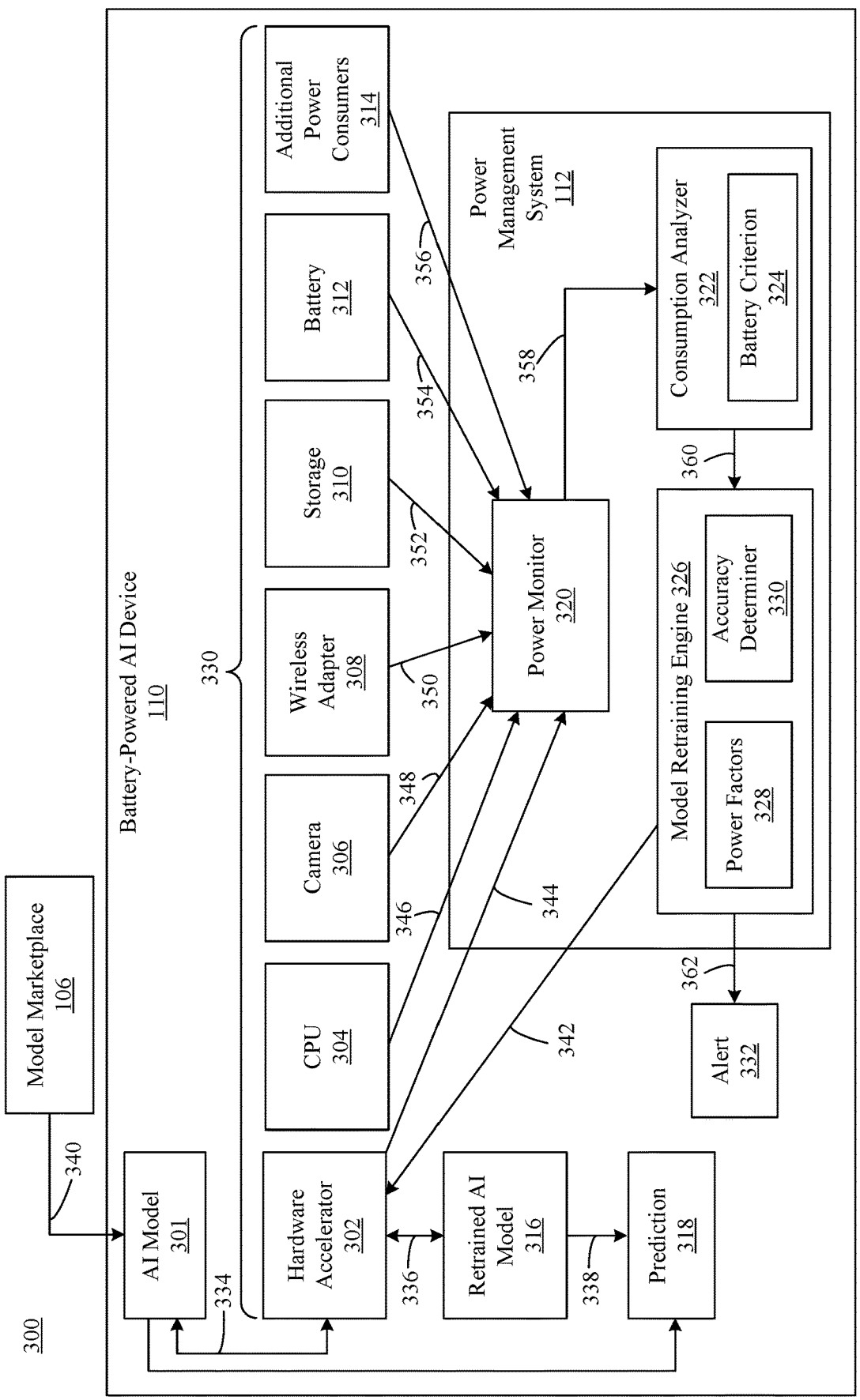
FIG. 3 shows a block diagram of a battery-powered AI device implementing techniques described herein, in accordance with an example embodiment.

FIG. 3 shows a block diagram of a system 300 comprising a battery-powered AI device implementing techniques described herein, in accordance with an example embodiment. As shown in FIG. 3, system 300 includes an example implementation of model marketplace 106 and battery-powered AI device 110. As shown in FIG. 3, battery-powered AI device comprises an example implementation of power management system 112, an AI model 301, a hardware accelerator 302, a CPU 304, a camera 306, a wireless adapter 308, a storage 310, a battery 312, one or more additional power consumers 314, a retrained AI model 316, a prediction 318, and an alert 332. Hardware accelerator 302, CPU 304, camera 306, wireless adapter 308, storage 310, battery 312, and additional power consumers 314 may be referred to collectively as power consumers 330. Power management system 112 comprises a power monitor 320, a consumption analyzer 322, and a model retraining engine 326. Consumption analyzer 322 includes a battery criterion 324. Model retraining engine 326 comprises one or more power factors 328 and an accuracy determiner 330. Flowchart 200 and system 300 are described in further detail as follows.

Flowchart 200 of FIG. 2 begins with step 202. In step 202, for each of a plurality of components in a battery-powered device, a power consumption for the component is measured during execution of a first AI model. For instance, with reference to FIG. 3, power monitor 320 is configured to measure a power consumption for each of power consumer 330 during execution of AI model 301. AI model 301 may be obtained 340 (e.g., downloaded) from model marketplace 106 in a similar manner as described above. In implementations, hardware accelerator 302 may execute AI model 301 during a normal operation of battery-powered AI device 110 to generate an output based on a set of input data. For example, hardware accelerator 302 may execute AI model 301 to detect the presences of humans or faces in an image captured by camera 306, and provide information associated with such a detection (e.g., to another device such as computing device 102). This example is illustrative only, and those skilled in the art will understand and appreciate that hardware accelerator 302 may execute any type of AI model obtained from model marketplace 106, or any other source, to generate a predicted value (e.g., a detected object, a classification, etc.). It will also be appreciated that hardware accelerator 302 is not required in all implementations. Rather, in some example embodiments, battery-powered AI device 110 may utilize CPU 304 or any other suitable processor to carry out processing functions (e.g., execution of a model, retraining of a model, etc.).

Accordingly, during execution of AI model 301, battery-powered AI device 110 may utilize one or more components to generate a predicted value. In implementations, execution of AI model 301 may rely on components of battery-powered AI device 110 including, but not limited to, hardware accelerator 302, CPU 304, camera 306, wireless adapter 308, storage 310, battery 312, and one or more additional power consumers 314.

Hardware accelerator 302 comprises any processor or processors intended to execute certain types of operations (e.g., operations that may be inefficiently executed by CPU 304). In implementations, hardware accelerator 302 may comprise a TPU, GPU, FPGA, ASIC, or any other specialized hardware processor that may execute certain types operations. CPU 304 comprises a central processing unit of battery-powered AI device 110, and may be configured to execute software (e.g., an operating system) and/or carry out general processing operations on battery-powered AI device 110.

Camera 306 includes any type of image sensor, such as an image sensor array (e.g., charged coupled device (CCD), complementary metal oxide semiconductor (CMOS), etc.), capable of capturing images at any frame rate or resolution. In implementations, camera 306 may capture images that may be fed into an AI model to generate a prediction (e.g., images of a retail establishment to detect the presence of humans or objects).

Wireless adapter 308 comprises hardware and/or circuitry to enable communications between battery-powered AI device 102 and devices externally located, such as computing device 102, server 104, or any other device not expressly illustrated. Wireless adapter 308 may enable communications over any suitable network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc.

Storage 310 comprises one or more storage devices located within (e.g., integral to) battery-powered AI device 110, or coupled thereto. Storage 310 may include as physical storage devices (e.g., hard disk drives, flash drives, solid-state drives, optical disk drives, RAM devices, etc.) for storing any one or more of an operating system, applications, software, etc. for storing information associated with an AI model, obtaining input data (e.g., images from camera 306), logging predictions, etc.

Battery 312 may comprise any one or more devices capable of storing charge for consumption by one or more components of battery-powered device. Battery 312 may include one or more alkaline batteries, lithium-ion (Li-ion) batteries, lithium coin batteries, carbon zinc batteries, nickel cadmium batteries (Ni-Cad), nickel-metal hydride (Ni-MH) batteries, lead-acid batteries, or other types of batteries as will be appreciated to those skilled in the art. Battery 312 may be internal or external to a housing of battery-powered AI device 110, and may be disposable or rechargeable. Battery 312 may be any size or shape (e.g., coin, AAA, AA, C, D, automotive, etc.).

Additional power consumers 314 include any one or more power consuming components of battery-powered AI device 110 not expressly described or illustrated. For instance, additional power consumers 314 may include one or more sensors (e.g., GPS, orientation, accelerometers, gyroscopes, biometric) that may be integral to, or communicatively coupled to, battery-powered AI device. In other examples, additional power consumers 314 may comprise other hardware components of battery-powered AI device 110, such as display devices, speakers, microphones, input devices, etc. that may consume power during operation of battery-powered AI device 110. It is noted that this list is only illustrative, and some AI models may utilize more or less than the components shown in FIG. 3.

In implementations, AI model 301 may be generated and/or trained using a different hardware configuration than battery-powered AI device 110. In some instances, AI model 301 may therefore not be configured to execute in an optimized manner on battery-powered AI device 110, and may consume power an in excessive fashion. During execution of AI model 301, power monitor 320 may be configured to measure an actual power consumption for each of the hardware components of battery-powered AI device 110 during execution of AI model 301. For instance, power monitor 320 may measure a power consumption 344 of hardware accelerator 302, a power consumption 346 of CPU 304, a power consumption 348 of camera 306, a power consumption 350 of wireless adapter 308, a power consumption 352 of storage 310, a power consumption 354 of battery 312, and a power consumption 356 of one or more additional power consumers 314. As used herein, a measured power consumption may include any information relating to an actual power consumption of a component, including a total amount of power consumed in a period of time, a rate of consumption (e.g., a rate of discharge), a time during which power is consumed, a length of time of power consumption, a frequency of power consumption, or any other information related to the consumption of power for a given component of power consumers 330. It is also noted that the measured power consumption may also include other features related to the monitored components during operation, such as an amount or time of a storage access of storage 310, a camera resolution of camera 306, a time or bandwidth of network usage of wireless adapter 308, or any other characteristic of a monitored component that may indicate that a component is consuming power during execution of AI model 301 (e.g., when power consumption of a component goes high or low).

Power monitor 320 may measure the power consumption of power consumers 330 in various ways, such as by monitoring power usage on one or more power rails of battery-powered AI device 110. For instance, power monitor 320 may measure the power consumption of different power rails for hardware accelerator 302, CPU 304, camera 306, wireless adapter 308, storage 310, battery 312, and/or additional power consumers 314. In implementations, power monitor 320 may integral to battery-powered AI device 110 (e.g., within a common housing), or may be coupled thereto (e.g., via a wired or wireless coupling). Power monitor 320 may be implemented any suitable form, including but not limited to hardware (e.g., as a microchip or other circuitry), or software (e.g., as executable code, such as on an operating system or other executable program of battery-powered AI device 110). Power monitor 320 may measure power consumption in any suitable manner, such as measuring a current level consumed by a power consumer (e.g., at a given moment, over a period of time, etc.), a voltage level applied to the power consumer, and combine the measured current level and voltage level (e.g., by multiplication, integration, etc.) to determine the power consumption of the power consumer. In other embodiments, power monitor 320 may determine/measure power consumption in other ways, as would be apparent to person skilled in the relevant art(s) based on the teachings herein.

In some examples, power monitor 320 may measure the power consumption of power consumers 330 automatically after AI model 301 is obtained for execution on battery-powered AI device 110. For instance, during an initial period of time in which AI model 301 is executed, power monitor 320 may automatically monitor the power consumption of power consumers 330 to obtain power consumption information. In some other examples, power monitor 320 may monitor the power consumption of power consumers 330 in response to a manual trigger (e.g., a user request).

In step 204, it is predicted whether a battery criterion would be satisfied during operation of the battery-powered device that includes execution of the first AI model, based on the measured power consumption of the plurality of components. For instance, with reference to FIG. 3 consumption analyzer 322 may obtain 358 the measured powered consumption of the plurality of components (e.g., power consumers 330), and predict whether battery criterion 324 would be satisfied during operation of battery-powered AI device 110 that includes execution 334 of AI model 301 based on the measured power consumption. Battery criterion 324 may comprise any desired or intended battery characteristic, such as a minimum operating time (e.g., 30 days) of battery-powered AI device 110 on a single charge. In examples, therefore, once AI model 301 is loaded onto battery-powered AI device 110, power monitor 320 may collect power consumption information from components of the device and consumption analyzer 322 may determine whether battery-powered AI device 110 implementing the loaded model can still achieve a desired criterion.

Consumption analyzer 322 may predict whether battery criterion would be satisfied during operation of battery-powered AI device 110 in various ways. For instance, consumption analyzer 322 may obtain a total battery capacity of battery-powered AI device 110 (e.g., in milliampere-hours or ampere-hours) that identifies an available charge capacity of the device. Based on a monitored consumption of the plurality of components during execution of AI model 301 over a period of time, consumption analyzer 322 may identify a rate of discharge of the battery (or batteries, if multiple batteries are present) of battery-powered AI device 110, and calculate therefrom a length of time that the battery will be depleted. In an event that the battery of battery-powered AI device 110 is predicted to be depleted sooner than indicated in battery criterion 324, consumption analyzer 322 may predict that battery criterion 324 would not be satisfied during operation of battery-powered AI device during execution of AI model 301. Conversely, in an event that the battery of battery-powered AI device 110 is predicted to last longer than indicated in battery criterion 324, consumption analyzer 322 may predict that battery criterion 324 would be satisfied during operation of battery-powered AI device during execution of AI model 301.

In step 206, the first AI model is retrained if the battery criterion is not predicted to be satisfied during operation of the batter-powered device. For instance, with reference to FIG. 3, model retraining engine 326 may receive a determination 360 that battery criterion 324 is not predicted to be satisfied during operation of battery-powered AI device 110 in which AI model 301 is executed. When such a determination is received, model retraining engine 326 may be configured to cause 342 hardware accelerator 302 to retrain AI model 301 to generate 336 retrained AI model 316. In implementations, when retrained AI model 316 is generated in accordance with techniques described herein, power consumption may be reduced such that an aggregated power consumption of battery-powered AI device 110 executing retrained AI model 304 is less than an aggregated power consumption of battery-powered device 110 executing the AI model 301.

In examples, model retraining engine 326 may cause hardware accelerator 302 to generate retrained AI model 316 using one or more power factors 328. Power factors 328 may comprise, for instance, any one or more attributes of power consumers 330 that may be adjusted based on the measured power consumption of power consumers 330. For instance, power factors 328 may identify one or more adjustable attributes of power consumers 330 such as a processing frequency of CPU 304, a camera resolution of camera 306, a bandwidth or frequency of wireless adapter 308, a batching configuration to alter a frequency of accesses of storage 310, or any other factor that may reduce a power consumption when an AI model is executed on battery-powered AI device 110. In some cases, a selection of power factors 328 may be based on the measured power consumption of power consumers 330.

For instance, if AI model 301 comprised a face-detection model that was determined to utilize an excessive power consumption, model retraining engine 326 may select a power factor that alters a camera resolution (e.g., by lowering a camera resolution) for use in retraining AI model 301. If the selected power factor did not lower the power consumption to a desired amount (e.g., battery criterion 324 is still not satisfied after retraining using the selected power factor), model retraining engine 326 may select an additional or different power factor (e.g., batching to reduce storage accesses, a lower frequency of wireless access, etc.). In other examples, model retraining engine 326 may select a plurality of power factors 328 in a single pass when causing AI model 301 to be retrained. It is noted that these examples are only meant to be illustrative, and one skilled in the art will appreciate that model retraining engine 326 may select any one or more power factors 328 that are predicted to cause hardware accelerator 302 to generate retrained AI model 316 in a manner that would result in an altered power consumption (e.g., a reduced consumption) when executed on battery-powered AI device 110.

In step 208, the retrained AI model is provided for execution on the battery-powered device. For instance, with reference to FIG. 3, hardware accelerator 302 may be configured to provide retrained AI model 316 for execution on battery-powered AI device 110. Retrained AI model 316 may be executed on any suitable framework (e.g., a NN, DNN, or ML framework), and may be executed using one or more processing components (e.g., hardware accelerator 302, CPU 304, or any other processor) to generate 338 prediction 318. Prediction 318 may comprise an output generated as a result of executing retrained AI model 316, such as a predicted value or an inference (e.g., a classification, an object detection, a face detection, etc.). In some implementations, prediction 318 may be provided locally, such as in a log, spreadsheet, repository, etc. of battery-powered AI device 110. In other implementations, prediction 318 may be outputted on a screen or as any other indicator (e.g., a light-emitting diode indicator) on or coupled to battery-powered AI device 110. In yet other examples, prediction 318 may be provided, via wireless adapter 308, to one or more other devices, such as computing device 102, where prediction 318 may be stored and/or viewed on a suitable interface.

In implementations, therefore, power management system 112 may alter a power consumption of battery-powered AI device 110 when executing an AI model, which can be advantageous for power-sensitive intelligent devices (e.g., AIoT devices). In particular, when such a power-sensitive device obtains an AI model from a cloud or other source that may not be optimized for the particular device, the expectation that the power-sensitive device last a certain length of time (e.g., 30 days) may no longer be applicable if the AI model exhibits an excessive power consumption for the particular device. For instance, even if two devices download the same AI model and have similar hardware configuration, with the exception of a battery in one of the devices being larger than the battery in the other device, the AI model may satisfy the battery criterion on one device but not the other due to the battery size difference. In such an example, the device with the smaller battery may retrain the AI model based on one or more power factors 328 described here to reduce an overall power consumption such that the retrained model, when executed on the device, would allow the battery-powered device to meet the battery criterion (e.g., 30 days on a single charge). Thus, in accordance with the described techniques, the particular hardware configuration of battery-powered AI device 110 may be factored into account, enabling a retrained AI model to be generated that utilizes less power while maintaining a sufficient accuracy.

As described above, it may be predicted whether a battery criterion would be satisfied during operation of the battery-powered device. In some implementations, the battery criterion may comprise a minimum operating length. For example, FIG. 4 shows a flowchart of a method for determining whether a predicted battery life of the battery-powered device exceeds a minimum operating length, in accordance with an example embodiment. In an implementation, the method of flowchart 400 may be implemented by consumption analyzer 322. FIG. 4 is described with continued reference to FIGS. 1 and 3. Other structural and operational implementations will be apparent to persons skilled in the relevant art(s) based on the following discussion regarding flowchart 400, system 100 of FIG. 1, and system 300 of FIG. 3.

Flowchart 400 begins with step 402. In step 402, it is determined whether a predicted battery life of the battery-powered device exceeds a minimum operation length. For instance, with reference to FIG. 3, consumption analyzer 322 may determine a predicted battery life of battery-powered AI device 110 based at least on the measured power consumption for power consumers 330 during execution of AI model 301. The predicted battery life may be determined in various ways, such as by identifying an amount of battery consumption during a period of time in which AI model 301 was executed on battery-powered AI device 110, and calculating therefrom a length of time that battery 312 will have a sufficient charge to continue operating. In other examples, the predicted battery life may be determined by determining or estimating a rate of discharge of battery 312 during execution of AI model 301, and similarly calculating therefrom a length of time that battery 312 will have a sufficient charge to continue operating.

Consumption analyzer 312 may compare the predicted battery life with battery criterion 324 that may indicate a minimum operation length. The minimum operation length may be a desired or expected length of time that battery 312 should last before being depleted to an inoperable level. In other words, the minimum operation length may indicate the length of time that battery-powered AI device 110 may continue operating on a single charge of battery 312. If the predicted battery life exceeds the minimum operation length, consumption analyzer 322 may predict that battery-powered AI device 110 will meet a desired or expected battery criterion (e.g., it will last for more than 30 days before the batteries are replaced or recharged). In such examples, AI model 301 need not be retrained since the battery criterion is satisfied. However, in some other examples, model retraining engine 326 may nevertheless cause AI model 301 to be retrained in such instances to reduce the total power consumption, thereby lengthening the life of battery 312. If the predicted battery life does not exceed the minimum operation length, model retaining engine 326 may cause hardware accelerator 302 to generate retrained AI model 316 to reduce the total power consumption, in accordance with techniques described herein.

It is noted that while example embodiments are described in which battery criterion 324 may indicate a minimum operation length of 30 days, such a time period is illustrative only. Those skilled in the art will appreciate that any other suitable minimum operation length may be implemented (e.g., 1 day, 5 days, 1 year, etc.). Further, battery criterion 324 may optionally be configured based on a user input, such as via a suitable interface of computing device 102 or via an interface of battery-powered AI device 110. In some implementations, a selection of a different battery criterion (e.g., 15 days instead of 30 days) may be received (e.g., from a user) in response to a determination that a retrained AI model still exhibits an excessive power consumption for battery-powered AI device 110.

As described above, AI model 301 may be retrained if it is predicted that the battery criterion will not be satisfied during operation of battery-powered AI device 110. In some implementations, AI model 301 may be retrained by altering a feature vector used during the training process. For example, FIG. 5 shows a flowchart 500 of a method for adding a feature vector to retrain an AI model on a device, in accordance with an example embodiment. In an implementation, the method of flowchart 500 may be implemented by model retraining engine 326. FIG. 5 is described with continued reference to FIGS. 1 and 3. Other structural and operational implementations will be apparent to persons skilled in the relevant art(s) based on the following discussion regarding flowchart 500, system 100 of FIG. 1, and system 300 of FIG. 3.

Flowchart 500 begins with step 502. In step 502, a power factor associated with at least one of the plurality of components of the battery-powered device is added to a feature vector used to retrain the first AI model. For instance, with reference to FIG. 3, model retraining engine 326 may be configured to add, to a feature vector used to retrain AI model 301, one or more of power factors 328 associated with one or more of power consumers 330. For example, model retraining engine 326 may cause hardware accelerator 302 to retrain AI model 301 by including, in a feature vector used to retrain the model, one or more features relating to hardware accelerator 302, CPU 304, camera 306, wireless adapter 308, storage 310, battery 312, or one or more additional power consumers 314. As an example, model retraining engine 326 may be configured to add a feature to a vector used to retrain AI model 301 that relating to a different frequency for CPU 304, selection of a different processor if one is present, selecting a different memory or storage device if one is present, a batching configuration to reduce accesses to storage 310, a resolution of camera 306, a bandwidth or frequency of wireless adapter 308, or any other features associated with power consumers 330.

In this manner, hardware accelerator 302 may generate retrained AI model 316 using the additional feature vectors that are tailored for battery-powered AI device 110 in an attempt to reduce the overall power consumption. Upon generating retrained AI model 316, hardware accelerator 316 may execute the retrained model to generate prediction 318 based on a set of input data. Power monitor 320 may measure power consumption of power consumers 330 in a similar manner as described above, and consumption analyzer 322 may predict whether execution of retrained AI model 316 on battery-powered AI device would satisfy battery criterion 324. If battery criterion 324 is predicted to be satisfied, battery-powered AI device 110 may continue to execute retrained AI model 316 to generate prediction 318 during operation thereof. If battery criterion 324 is not predicted to be satisfied for retrained AI model 316, model retraining engine 326 may further refine the feature vector (e.g., revising a feature, adding one or more additional or different features, etc.) during the retraining process to generate another retrained AI model. Such a process may be performed iteratively until a retrained AI model is generated that is predicted to satisfy battery criterion 324.

In some implementations, model retraining engine 326 may be configured to determine an accuracy of a retrained model following retraining. For example, FIG. 6 shows a flowchart 600 of a method for determining whether a retrained AI model satisfies an accuracy criterion, in accordance with an example embodiment. In an implementation, the method of flowchart 600 may be implemented by model retraining engine 326. FIG. 6 is described with continued reference to FIGS. 1 and 3. Other structural and operational implementations will be apparent to persons skilled in the relevant art(s) based on the following discussion regarding flowchart 600, system 100 of FIG. 1, and system 300 of FIG. 3.

Flowchart 600 begins with step 602. In step 602, it is determined whether the retrained model satisfies an accuracy criterion prior to providing the retrained AI model. For instance, accuracy determiner 330 of model retraining engine 326 may be configured to determine, upon hardware accelerator 302 generating retrained AI model 316, whether retrained AI model 316 satisfies an accuracy criterion. The accuracy criterion, for instance, may comprise a threshold level of accuracy such that retrained AI model 316, when executed, can still generate predictions in an accurate and/or reliable manner. Accuracy determiner 330 may test the accuracy of retrained AI model 316 in various ways, such as by testing the model against a set of known samples. In some implementations, accuracy determiner 330 may determine, on a pass/fail basis, whether retrained AI model 316 is sufficiently accurate. In other implementations, accuracy determiner may assign an accuracy score that indicates a level of accuracy for retrained AI model 316 that may be compared against a threshold level of accuracy. These examples are only illustrative, and other techniques may also be implemented to determine whether retrained AI model 316 is accurate for its intended purpose.

In some implementations, accuracy determiner 330 may determine an accuracy of retrained AI model 316 prior to consumption analyzer 322 predicting whether battery-powered AI device 110 executing the retrained model would d satisfy the battery criterion. In other words, upon generating retrained AI model 316, it may be determined whether the retrained model is sufficiently accurate. If retrained AI model 316 is not sufficiently accurate, model retraining engine 326 may revise the feature vector, and cause the model to be retrained again to increase the accuracy (e.g., by increasing a camera resolution) until an accurate model is achieved.

Once a model is determined to be sufficiently accurate, a determination may be made whether the retrained model, when executed, is predicted to satisfy battery criterion 324 in a similar manner as described above. Alternatively, in some implementations, it may be determined whether the retrained model satisfies battery criterion 324 before determining an accuracy of retrained model 316. In the above manner, retrained AI model 316 may be generated such that it exhibits a sufficient accuracy, while also satisfying battery criterion 324 (e.g., that the device can operate on a single charge for a certain length of time before the battery is depleted).

In some implementations, if retrained AI model 316 cannot be generated such that the model meets a desired accuracy or is predicted not to satisfy battery criterion 324, alert 332 may be generated 362 indicating that either the model did not meet an accuracy criterion and/or is not predicted to satisfy a battery criterion. In such instances, a user may configure power management system 112 (e.g., via computing device 102) with a different battery criterion (e.g., 15 days instead of 30 days), adjust an accuracy criterion, accept implementation of original AI model 301 or retrained AI model 316, or obtain a different model from model marketplace 106.

It is noted that the example embodiments described herein are meant to be illustrative only. For instance, battery-powered AI device 110 need not be a portable device (e.g., an IoT or AIoT device), but may comprise any other device that is powered by a batter in which an AI model is implemented, such as robotic devices, electric vehicles that use an AI model for object detection, lane departure, self-driving, or any other power-sensitive device.

III. Example Computer System Implementation

Computing device 102, server 104, model marketplace 106, battery-powered AI device 110, power management system 112, AI model 301, hardware accelerator 302, CPU 304, camera 306, wireless adapter 308, storage 310, battery 312, additional power consumers 314, retrained AI model 316, prediction 318, power monitor 320, consumption analyzer 322, battery criterion 324, model retraining engine 326, accuracy determiner 330, alert 332, flowchart 200, flowchart 400, flowchart 500, and/or flowchart 600 may be implemented in hardware, or hardware combined with one or both of software and/or firmware. For example, computing device 102, server 104, model marketplace 106, battery-powered AI device 110, power management system 112, AI model 301, hardware accelerator 302, CPU 304, camera 306, wireless adapter 308, storage 310, battery 312, additional power consumers 314, retrained AI model 316, prediction 318, power monitor 320, consumption analyzer 322, battery criterion 324, model retraining engine 326, accuracy determiner 330, alert 332, flowchart 200, flowchart 400, flowchart 500, and/or flowchart 600 may be implemented as computer program code/instructions configured to be executed in one or more processors and stored in a computer readable storage medium.

Alternatively, computing device 102, server 104, model marketplace 106, battery-powered AI device 110, power management system 112, AI model 301, hardware accelerator 302, CPU 304, camera 306, wireless adapter 308, storage 310, battery 312, additional power consumers 314, retrained AI model 316, prediction 318, power monitor 320, consumption analyzer 322, battery criterion 324, model retraining engine 326, accuracy determiner 330, alert 332, flowchart 200, flowchart 400, flowchart 500, and/or flowchart 600 may be implemented as hardware logic/electrical circuitry.

For instance, in an embodiment, one or more, in any combination, of computing device 102, server 104, model marketplace 106, battery-powered AI device 110, power management system 112, AI model 301, hardware accelerator 302, CPU 304, camera 306, wireless adapter 308, storage 310, battery 312, additional power consumers 314, retrained AI model 316, prediction 318, power monitor 320, consumption analyzer 322, battery criterion 324, model retraining engine 326, accuracy determiner 330, alert 332, flowchart 200, flowchart 400, flowchart 500, and/or flowchart 600 may be implemented together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
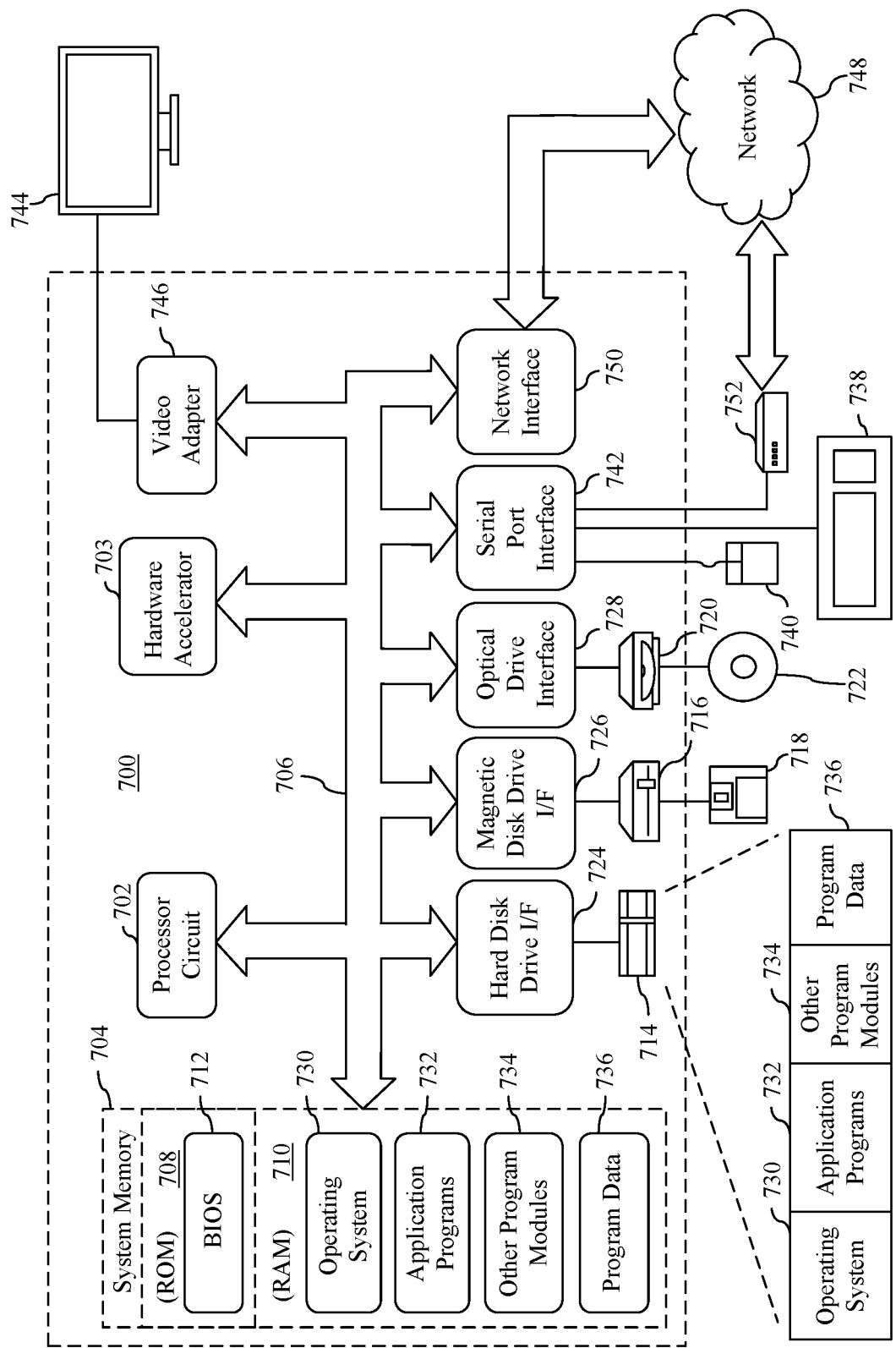
FIG. 7 is a block diagram of an example processor-based computer system that may be used to implement various embodiments.

FIG. 7 depicts an exemplary implementation of a computing device 700 in which embodiments may be implemented. For example, computing device 102, server 104, model marketplace 106, battery-powered AI device 110, power management system 112, AI model 301, hardware accelerator 302, CPU 304, camera 306, wireless adapter 308, storage 310, battery 312, additional power consumers 314, retrained AI model 316, prediction 318, power monitor 320, consumption analyzer 322, battery criterion 324, model retraining engine 326, accuracy determiner 330, alert 332, flowchart 200, flowchart 400, flowchart 500, and/or flowchart 600 (and/or any of the steps of flowcharts 200, 400, 500, and 600 described therein) may be implemented in one or more computing devices similar to computing device 700 in stationary or mobile computer embodiments, including one or more features of computing device 700 and/or alternative features. The description of computing device 700 provided herein is provided for purposes of illustration, and is not intended to be limiting. Embodiments may be implemented in further types of computer systems, as would be known to persons skilled in the relevant art(s).

As shown in FIG. 7, computing device 700 includes one or more processors, referred to as processor circuit 702, a hardware accelerator 703, a system memory 704, and a bus 706 that couples various system components including system memory 704 to processor circuit 702 and hardware accelerator 703. Processor circuit 702 and/or hardware accelerator 703 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Hardware accelerator 703 may carry out any of the functions described herein with respect to hardware accelerator 302. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random-access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing any of the features of computing device 102, server 104, model marketplace 106, battery-powered AI device 110, power management system 112, AI model 301, hardware accelerator 302, CPU 304, camera 306, wireless adapter 308, storage 310, battery 312, additional power consumers 314, retrained AI model 316, prediction 318, power monitor 320, consumption analyzer 322, battery criterion 324, model retraining engine 326, accuracy determiner 330, alert 332, flowchart 200, flowchart 400, flowchart 500, and/or flowchart 600 and/or further embodiments described herein.

A user may enter commands and information into computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of embodiments discussed herein. Accordingly, such computer programs represent controllers of the computing device 700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Mobile Device Implementation

Figure 8:
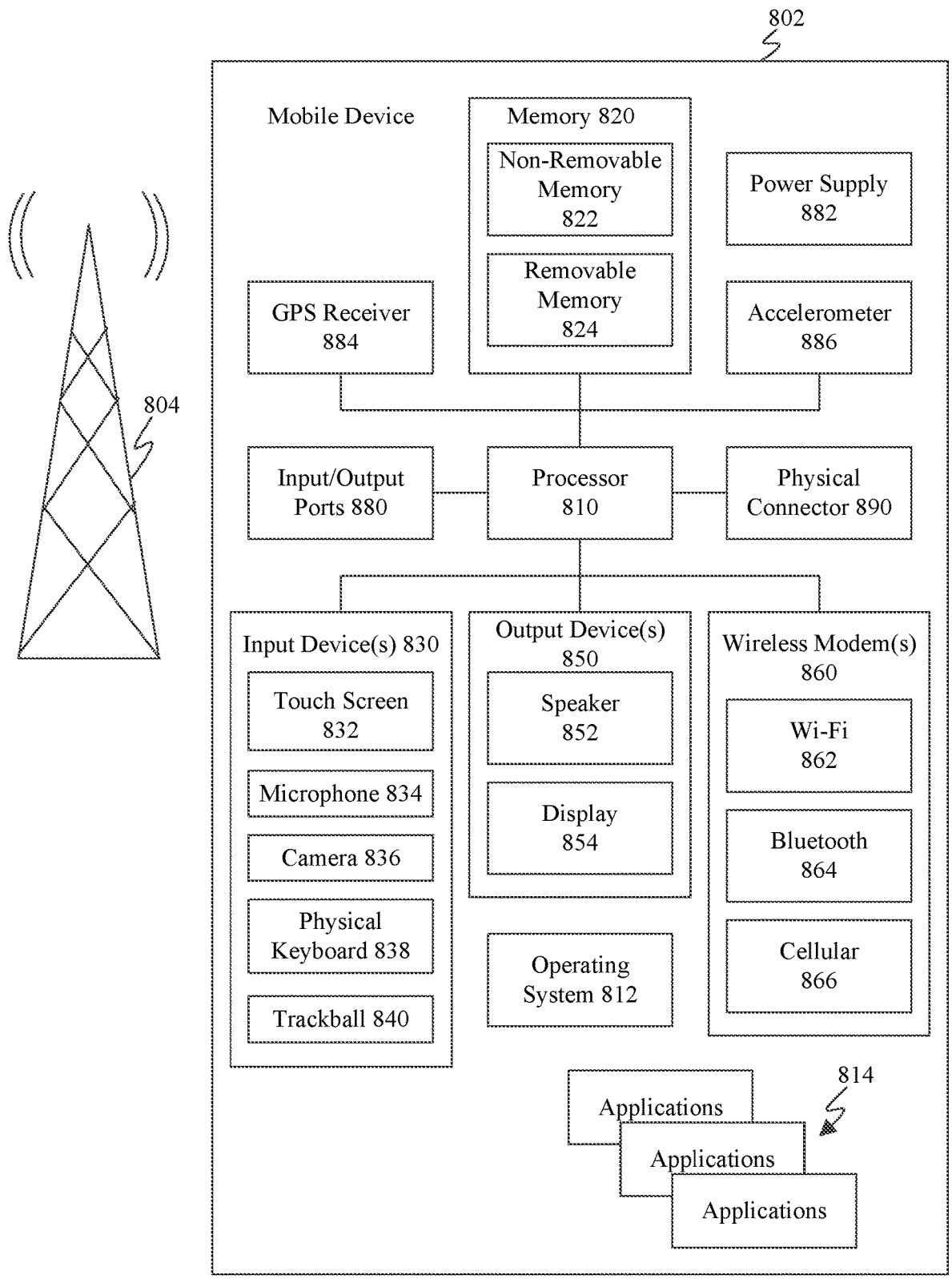
FIG. 8 is a block diagram of an example mobile device that may be used to implement various embodiments.

FIG. 8 is a block diagram of an exemplary mobile device 802 that may implement embodiments described herein. For example, mobile device 802 may be used to implement any of computing device 102, server 104, model marketplace 106, battery-powered AI device 110, power management system 112, AI model 301, hardware accelerator 302, CPU 304, camera 306, wireless adapter 308, storage 310, battery 312, additional power consumers 314, retrained AI model 316, prediction 318, power monitor 320, consumption analyzer 322, battery criterion 324, model retraining engine 326, accuracy determiner 330, alert 332, or steps of flowchart 200, flowchart 400, flowchart 500, and/or flowchart 600. As shown in FIG. 8, mobile device 802 includes a variety of optional hardware and software components. Any component in mobile device 802 can communicate with any other component, although not all connections are shown for ease of illustration. Mobile device 802 can be any of a variety of computing devices (e.g., cell phone, smartphone, handheld computer, Personal Digital Assistant (PDA), etc.) and can allow wireless two-way communications with one or more mobile communications networks 804, such as a cellular or satellite network, or with a local area or wide area network.

The illustrated mobile device 802 can include a controller or processor 810 (e.g., signal processor, microprocessor, ASIC, or other control and processing logic circuitry) for performing such tasks as signal coding, data processing, input/output processing, power control, and/or other functions. An operating system 812 can control the allocation and usage of the components of mobile device 802 and provide support for one or more application programs 814 (also referred to as "applications" or "apps"). Application programs 814 may include common mobile computing applications (e.g., digital personal assistants, e-mail applications, calendars, contact managers, web browsers, messaging applications) and any other computing applications (e.g., word processing applications, mapping applications, media player applications).

The illustrated mobile device 802 can include memory 820. Memory 820 can include non-removable memory 822 and/or removable memory 824. Non-removable memory 822 can include RAM, ROM, flash memory, a hard disk, or other well-known memory devices or technologies. Removable memory 824 can include flash memory or a Subscriber Identity Module (SIM) card, which is well known in GSM communication systems, or other well-known memory devices or technologies, such as "smart cards." Memory 820 can be used for storing data and/or code for running operating system 812 and applications 814. Example data can include web pages, text, images, sound files, video data, or other data to be sent to and/or received from one or more network servers or other devices via one or more wired or wireless networks. Memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile device 802 can support one or more input devices 830, such as a touch screen 832, a microphone 834, a camera 836, a physical keyboard 838 and/or a trackball 840 and one or more output devices 850, such as a speaker 852 and a display 854. Other possible output devices (not shown) can include piezoelectric or other haptic output devices. Some devices can serve more than one input/output function. For example, touch screen 832 and display 854 can be combined in a single input/output device. The input devices 830 can include a Natural User Interface (NUI).

Wireless modem(s) 860 can be coupled to antenna(s) (not shown) and can support two-way communications between the processor 810 and external devices, as is well understood in the art. The modem(s) 860 are shown generically and can include a cellular modem 866 for communicating with the mobile communication network 804 and/or other radio-based modems (e.g., Bluetooth 864 and/or Wi-Fi 862). At least one of the wireless modem(s) 860 is typically configured for communication with one or more cellular networks, such as a GSM network for data and voice communications within a single cellular network, between cellular networks, or between the mobile device and a public switched telephone network (PSTN).

Mobile device 802 can further include at least one input/output port 880, a power supply 882, a satellite navigation system receiver 884, such as a Global Positioning System (GPS) receiver, an accelerometer 886, and/or a physical connector 890, which can be a USB port, IEEE 1394 (FireWire) port, and/or RS-232 port. The illustrated components of mobile device 802 are not required or all-inclusive, as any components can be deleted, and other components can be added as would be recognized by one skilled in the art.

In an embodiment, mobile device 802 is configured to perform any of the functions of any of video computing device 102, server 104, model marketplace 106, battery-powered AI device 110, power management system 112, AI model 301, hardware accelerator 302, CPU 304, camera 306, wireless adapter 308, storage 310, battery 312, additional power consumers 314, retrained AI model 316, prediction 318, power monitor 320, consumption analyzer 322, battery criterion 324, model retraining engine 326, accuracy determiner 330, alert 332, or steps of flowchart 200, flowchart 400, flowchart 500, and/or flowchart 600. Computer program logic for performing the functions of these devices may be stored in memory 820 and executed by processor 810. By executing such computer program logic, processor 810 may be caused to implement any of the features of any of these devices. Also, by executing such computer program logic, processor 810 may be caused to perform any or all of the steps of flowchart 200, flowchart 400, flowchart 500, and/or flowchart 600.

V. Further Example Embodiments

A system in a battery-powered device is disclosed herein. The system includes: at least one processor circuit; and at least one memory that stores program code configured to be executed by the at least one processor circuit, the program code comprising: a power monitor configured to measure, for each of a plurality of components in the battery-powered device, a power consumption of the component during execution of a first artificial intelligence (AI) model stored on the battery-powered device; a consumption analyzer configured to predict whether a battery criterion would be satisfied during operation of the battery-powered device that includes execution of the first AI model, based on the measured powered consumption of the plurality of components; and a model retraining engine configured to: retrain the first AI model if the battery criterion is not predicted to be satisfied during operation of the battery-powered device, and provide the retrained AI model for execution on the battery-powered device.

In one implementation of the foregoing system, the prediction of whether the battery criterion would be satisfied during operation of the battery-powered device comprises determining whether a predicted battery life of the battery-powered device exceeds a minimum operation length.

In another implementation of the foregoing system, an aggregated power consumption of the battery-powered device executing the retrained AI model is less than an aggregated power consumption of the battery-powered device executing the first AI model.

In another implementation of the foregoing system, the model retraining engine is configured to add, to a feature vector used to retrain the first AI model, a power factor associated with at least one of the plurality of components.

In another implementation of the foregoing system, the model retraining engine is configured to retrain the first AI model using a hardware accelerator within the battery-powered device.

In another implementation of the foregoing system, the model retraining engine is configured to determine whether the retrained AI model satisfies an accuracy criterion prior to providing the retrained AI model.

In another implementation of the foregoing system, the plurality of components include at least one of: a battery, a wireless adapter, a camera, a central processing unit (CPU), a hardware accelerator, and a storage.

A method performed by a battery-powered device is disclosed herein. The method includes: measuring, for each of a plurality of components in the battery-powered device, a power consumption of the component during execution of a first artificial intelligence (AI) model stored on the battery-powered device; predicting whether a battery criterion would be satisfied during operation of the battery-powered device that includes execution of the first AI model, based on the measured powered consumption of the plurality of components; retraining the first AI model if the battery criterion is not predicted to be satisfied during operation of the battery-powered device; and providing the retrained AI model for execution on the battery-powered device.

In one implementation of the foregoing method, the predicting whether the battery criterion would be satisfied during operation of the battery-powered device comprises determining whether a predicted battery life of the battery-powered device exceeds a minimum operation length.

In another implementation of the foregoing method, an aggregated power consumption of the battery-powered device executing the retrained AI model is less than an aggregated power consumption of the battery-powered device executing the first AI model.

In another implementation of the foregoing method, the retraining the first AI model comprises adding, to a feature vector used to retrain the first AI model, a power factor associated with at least one of the plurality of components.

In another implementation of the foregoing method, the retraining the first AI model comprises retraining the first AI model using a hardware accelerator within the battery-powered device.

In another implementation of the foregoing method, the retraining the first AI model comprises determining whether the retrained AI model satisfies an accuracy criterion prior to providing the retrained AI model.

In another implementation of the foregoing method, the plurality of components include at least one of: a battery, a wireless adapter, a camera, a central processing unit (CPU), a hardware accelerator, and a storage.

A computer-readable storage medium is disclosed herein. The computer-readable storage medium has program instructions recorded thereon that, when executed by at least one processor of a computing device, perform a method, the method comprising: measuring, for each of a plurality of components in the battery-powered device, a power consumption of the component during execution of a first artificial intelligence (AI) model stored on the battery-powered device predicting whether a battery criterion would be satisfied during operation of the battery-powered device that includes execution of the first AI model, based on the measured powered consumption of the plurality of components; retraining the first AI model if the battery criterion is not predicted to be satisfied during operation of the battery-powered device; and providing the retrained AI model for execution on the battery-powered device.

In one implementation of the foregoing computer-readable storage medium, the predicting whether the battery criterion would be satisfied during operation of the battery-powered device comprises determining whether a predicted battery life of the battery-powered device exceeds a minimum operation length.

In another implementation of the foregoing computer-readable storage medium, an aggregated power consumption of the battery-powered device executing the retrained AI model is less than an aggregated power consumption of the battery-powered device executing the first AI model.

In another implementation of the foregoing computer-readable storage medium, the retraining the first AI model comprises adding, to a feature vector used to retrain the first AI model, a power factor associated with at least one of the plurality of components.

In another implementation of the foregoing computer-readable storage medium, the retraining the first AI model comprises retraining the first AI model using a hardware accelerator within the battery-powered device.

In another implementation of the foregoing computer-readable storage medium, the retraining the first AI model comprises determining whether the retrained AI model satisfies an accuracy criterion prior to providing the retrained AI model.

VI. Conclusion

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A system in a battery-powered device, the system comprising:
   at least one processor circuit; and
   at least one memory that stores program code configured to be executed by the at least one processor circuit, the program code comprising:
      a power monitor stored in the memory and configured to measure, for each of a plurality of components in the battery-powered device, a power consumption of the component during execution of a first artificial intelligence (AI) model stored on the battery-powered device;
      a consumption analyzer stored in the memory and configured to predict whether a battery criterion would be satisfied during operation of the battery-powered device that includes execution of the first AI model, based on the measured powered consumption of the plurality of components; and
      a model retraining engine stored in the memory and configured to:
         responsive to determining that the battery criterion is not predicted to be satisfied during operation of the battery-powered device, retrain the first AI model based on an altered power factor, the retraining of the AI model being effective to reduce power consumption attributable to execution of the AI model on the battery-operated device; and
         provide the retrained AI model for execution on the battery-powered device.

2. The system of claim 1, wherein the prediction of whether the battery criterion would be satisfied during operation of the battery-powered device comprises determining whether a predicted battery life of the battery-powered device exceeds a minimum operation length.

3. The system of claim 1, wherein an aggregated power consumption of the battery-powered device executing the retrained AI model is less than an aggregated power consumption of the battery-powered device executing the first AI model.

4. The system of claim 1, wherein the model retraining engine is configured to add, to a feature vector used to retrain the first AI model, a power factor associated with at least one of the plurality of components.

5. The system of claim 1, wherein the model retraining engine is configured to retrain the first AI model using a hardware accelerator within the battery-powered device.

6. The system of claim 1, wherein the model retraining engine is configured to determine whether the retrained AI model satisfies an accuracy criterion prior to providing the retrained AI model.

7. The system of claim 1, wherein the plurality of components include at least one of:
- a battery,
- a wireless adapter,
- a camera,
- a central processing unit (CPU),
- a hardware accelerator, and
- a storage.

8. A method performed by a battery-powered device, the method comprising:
- measuring, for each of a plurality of components in the battery-powered device, a power consumption of the component during execution of a first artificial intelligence (AI) model stored on the battery-powered device;
- predicting whether a battery criterion would be satisfied during operation of the battery-powered device that includes execution of the first AI model, based on the measured powered consumption of the plurality of components;
- responsive to determining that the battery criterion is not predicted to be satisfied during operation of the battery-powered device, retraining the first AI model based on an altered power factor, the retraining of the AI model being effective to reduce power consumption attributable to execution of the AI model on the battery operated device; and
- providing the retrained AI model for execution on the battery-powered device.

9. The method of claim 8, wherein the predicting whether the battery criterion would be satisfied during operation of the battery-powered device comprises determining whether a predicted battery life of the battery-powered device exceeds a minimum operation length.

10. The method of claim 8, wherein an aggregated power consumption of the battery-powered device executing the retrained AI model is less than an aggregated power consumption of the battery-powered device executing the first AI model.

11. The method of claim 8, wherein the retraining the first AI model comprises adding, to a feature vector used to retrain the first AI model, a power factor associated with at least one of the plurality of components.

12. The method of claim 8, wherein the retraining the first AI model comprises retraining the first AI model using a hardware accelerator within the battery-powered device.

13. The method of claim 8, wherein the retraining the first AI model comprises determining whether the retrained AI model satisfies an accuracy criterion prior to providing the retrained AI model.

14. The method of claim 8, wherein the plurality of components include at least one of:
- a battery,
- a wireless adapter,
- a camera,
- a central processing unit (CPU),
- a hardware accelerator, and
- a storage.

15. A computer-readable storage medium having program instructions recorded thereon that, when executed by at least one processor of a computing device, perform a method, the method comprising:
- measuring, for each of a plurality of components in the battery-powered device, a power consumption of the component during execution of a first artificial intelligence (AI) model stored on the battery-powered device;
- predicting whether a battery criterion would be satisfied during operation of the battery-powered device that includes execution of the first AI model, based on the measured powered consumption of the plurality of components;
- responsive to determining that the battery criterion is not predicted to be satisfied during operation of the battery-powered device, retraining the first AI model based on an altered power factor, the training of the AI model being effective to reduce power consumption attributable to execution of the AI model on the battery-operated device; and
- providing the retrained AI model for execution on the battery-powered device.

16. The computer-readable storage medium of claim 15, wherein the predicting whether the battery criterion would be satisfied during operation of the battery-powered device comprises determining whether a predicted battery life of the battery-powered device exceeds a minimum operation length.

17. The computer-readable storage medium of claim 15, wherein an aggregated power consumption of the battery-powered device executing the retrained AI model is less than an aggregated power consumption of the battery-powered device executing the first AI model.

18. The computer-readable storage medium of claim 15, wherein the retraining the first AI model comprises adding, to a feature vector used to retrain the first AI model, a power factor associated with at least one of the plurality of components.

19. The computer-readable storage medium of claim 15, wherein the retraining the first AI model comprises retraining the first AI model using a hardware accelerator within the battery-powered device.

20. The computer-readable storage medium of claim 15, wherein the retraining the first AI model comprises determining whether the retrained AI model satisfies an accuracy criterion prior to providing the retrained AI model.

* * * * *